United States Patent
Ichikawa et al.

(10) Patent No.: US 8,384,794 B2
(45) Date of Patent: Feb. 26, 2013

(54) IMAGE SENSING DEVICE AND CAMERA

(75) Inventors: Yuka Ichikawa, Machida (JP); Norihiko Ozaki, Sagamihara (JP)

(73) Assignee: Olympus Imaging Corp., Tokyo (JP)

( * ) Notice: Subject to any disclaimer, the term of this patent is extended or adjusted under 35 U.S.C. 154(b) by 378 days.

(21) Appl. No.: 12/721,300

(22) Filed: Mar. 10, 2010

(65) Prior Publication Data

US 2010/0231730 A1    Sep. 16, 2010

(30) Foreign Application Priority Data

Mar. 13, 2009 (JP) .................................. 2009-061931

(51) Int. Cl.
*H04N 5/228* (2006.01)
(52) U.S. Cl. ............... 348/222.1; 348/231.1; 348/231.2; 348/207.99; 348/207.1; 348/552
(58) Field of Classification Search ............... 348/222.1, 348/231.1, 231.2, 207.99, 207.1, 552
See application file for complete search history.

(56) References Cited

U.S. PATENT DOCUMENTS

2009/0059027 A1* 3/2009 Iwamoto .................... 348/222.1

FOREIGN PATENT DOCUMENTS

JP    2007-121579    5/2007

* cited by examiner

*Primary Examiner* — Yogesh Aggarwal
(74) *Attorney, Agent, or Firm* — John C. Pokotylo; Straub & Pokotylo

(57) ABSTRACT

An image sensing device is configured as follows. Namely, the device includes a recording unit configured to record correspondence data formed by making an action state of the object and voice information recorded prior to the shooting to correspond to each other, a voice determination unit configured to determine whether the voice acquired by a voice acquisition unit contains the voice information which forms the correspondence data, an action state determination unit configured to, when the voice acquired by the voice acquisition unit contains the voice information which forms the correspondence data, determine whether the action state of the object that corresponds to the voice information and an actual action state of the object match each other, and a control unit configured to, when the action state of the object that corresponds to the voice information and the actual action state of the object match each other, control shooting processing.

13 Claims, 7 Drawing Sheets

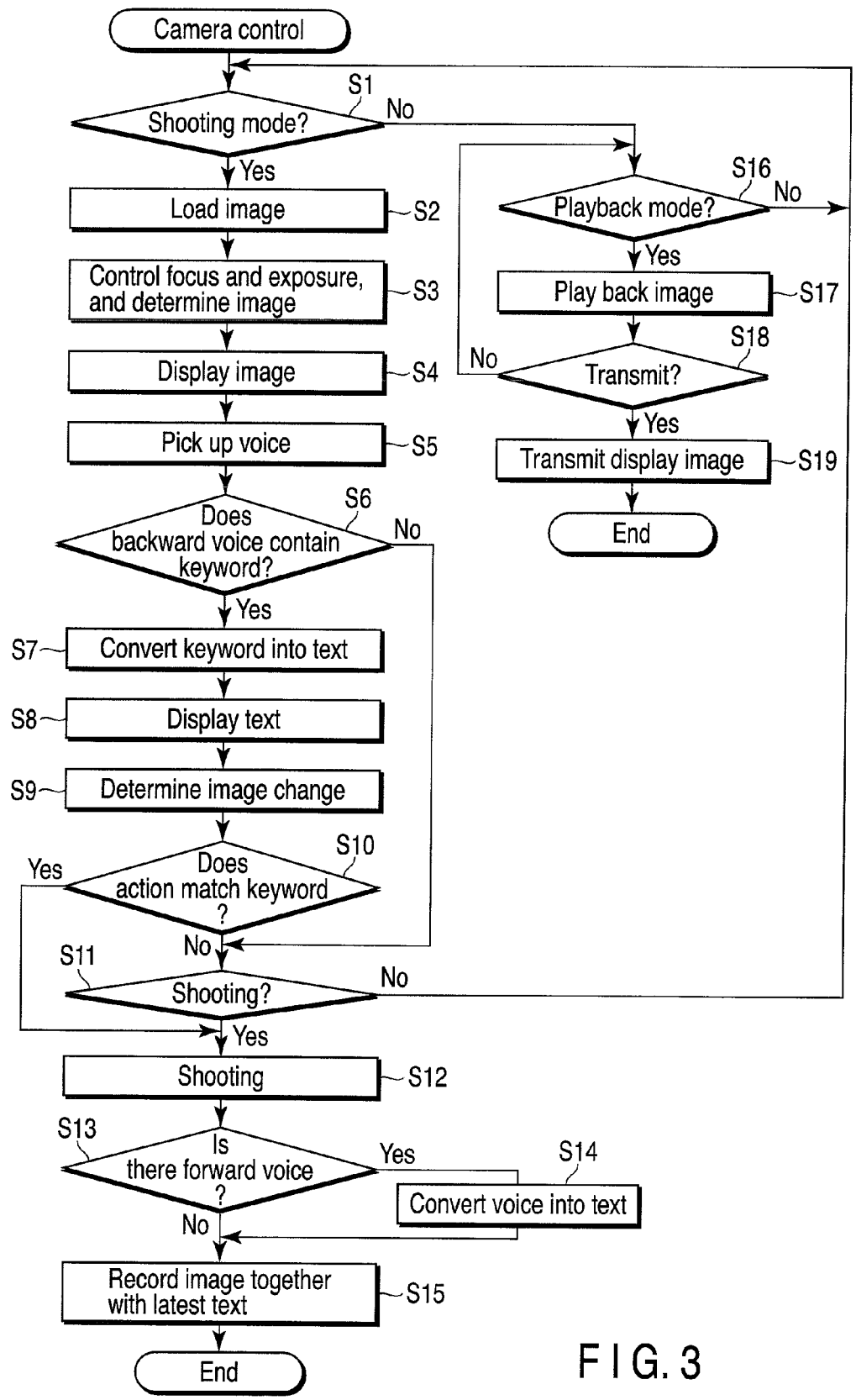
F I G. 3

|  | Stop! | Look at me! | Come here! | Smile and say cheese! | Give me pose! | Move closer! |
|---|---|---|---|---|---|---|
| Action | Action →none | Action →none | None →action | None | Action →none | Action →none |
| Change of face | — | None→ changed | — | Smiled | Vicinity of face changed | Plural faces came closer |

| | Stop! | Look at me! | Come here! | Smile and say cheese! | Give me pose! | Move closer! |
|---|---|---|---|---|---|---|
| Amplified reproduction voice | Please stop. | Please look at me. | Please come here. | Please say cheese. | Please give me pose. | You two move closer, please. |

F I G. 8

IMAGE SENSING DEVICE AND CAMERA

CROSS-REFERENCE TO RELATED APPLICATIONS

This application is based upon and claims the benefit of priority from prior Japanese Patent. Application No. 2009-061931, filed Mar. 13, 2009, the entire contents of which are incorporated herein by reference.

BACKGROUND OF THE INVENTION

1. Field of the Invention

The present invention relates to an image sensing device for a digital camera, camera-equipped cell phone, and the like, and a camera.

2. Description of the Related Art

When taking a picture of an object person, especially when taking a snapshot, the photographer sometimes calls to the object person. Particularly when the object is a child, his parent serving as a photographer calls to him and takes a photo.

For example, according to a technique disclosed in Jpn. Pat. Appln. KOKAI Publication No. 2007-121579, a voice recognition means determines whether the meaning of a voice input via a microphone matches a word which is registered in advance and expresses an instruction. If the voice recognition means determines that the meaning of the voice matches a word expressing an instruction, the instruction is output to an operation means.

BRIEF SUMMARY OF THE INVENTION

According to a first aspect of the invention, there is provided an image sensing device comprising: an image sensing unit configured to shoot an object and acquire an image; a recording unit configured to record correspondence data formed by making an action state of the object and voice information recorded prior to the shooting to correspond to each other; a voice acquisition unit configured to acquire at least a voice uttered by an operator of the image sensing device; a voice determination unit configured to determine whether the voice acquired by the voice acquisition unit contains the voice information which forms the correspondence data; an action state determination unit configured to, when the voice determination unit determines that the voice acquired by the voice acquisition unit contains the voice information which forms the correspondence data, determine whether the action state of the object that corresponds to the voice information and an actual action state of the object match each other; and a control unit configured to, when the action state determination unit determines that the action state of the object that corresponds to the voice information and the actual action state of the object match each other, control shooting processing by the image sensing unit.

According to a second aspect of the invention, three is provided an image sensing device comprising: a first image sensing unit configured to shoot an object and acquire an image; a recording unit configured to record correspondence data formed by making an action state of the object and a predetermined keyword to correspond to each other; a voice acquisition unit configured to acquire at least a voice uttered by an operator of the image sensing device; a keyword determination unit configured to determine whether the voice acquired by the voice acquisition unit contains the keyword which forms the correspondence data; a second image sensing unit configured to shoot the operator of the image sensing device and acquire an image; an action state determination unit configured to, when the keyword determination unit determines that the voice acquired by the voice acquisition unit contains the keyword which forms the correspondence data, determine, based on the image acquired by the first image sensing unit and the image acquired by the second image sensing unit, whether the action state of the object that corresponds to the keyword and an actual action state of the object match each other; and a shooting control unit configured to, when the action state determination unit determines that the action state of the object that corresponds to the keyword and the actual action state of the object match each other, control shooting processing by the first image sensing unit.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a flowchart showing an example of the control operation of the camera according to the first embodiment of the present invention;

FIG. 8 is a table showing a correspondence between a keyword contained in a voice and a reproduction voice.

DETAILED DESCRIPTION OF THE INVENTION

Preferred embodiments of the present invention will be described below with reference to the accompanying drawing.

First Embodiment

Figure 1:
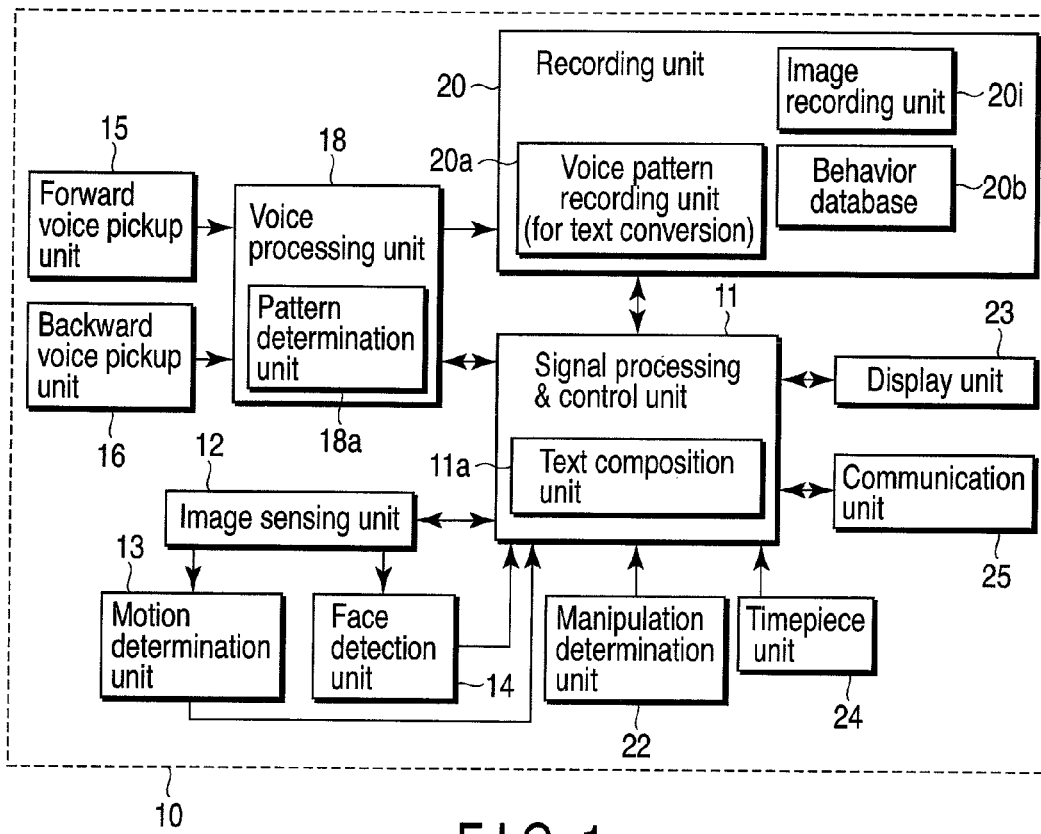
FIG. 1 is a block diagram showing an example of the schematic arrangement of a camera according to the first embodiment of an image sensing device of the present invention.

FIG. 1 is a block diagram showing an example of the schematic arrangement of a camera according to the first embodiment of an image sensing device of the present invention.

As shown in FIG. 1, a camera 10 according to the first embodiment of the present invention comprises a signal processing & control unit 11, image sensing unit 12, motion determination unit 13, face detection unit 14, forward voice pickup unit 15, backward voice pickup unit 16, voice processing unit 18, recording unit 20, manipulation determination unit 22, display unit 23, timepiece unit 24, and communication unit 25.

The signal processing & control unit 11 processes a shot image output from the image sensing unit 12 and controls the overall sequence of the camera 10. The signal processing & control unit 11 includes a text composition unit 11a which composites a text read out from a voice pattern recording unit 20a (to be described later) with a shot image and displays the resultant image.

The image sensing unit 12 includes a photographing lens, image sensor, image sensor driving circuit, and readout circuit (none of them are shown). The image sensing unit 12 is a photographing means for shooting a target object (not shown) to obtain a shot image.

The motion determination unit 13 determines the motion of an object based on the ratio at which the object occupies a frame representing the field, the distance to the object, the angle of view in shooting, and the like.

The face detection unit 14 detects a face image in an image sensed by the image sensing unit 12 by using a known face image recognition processing technique.

The forward voice pickup unit 15 is a voice acquisition unit having a microphone or the like. The forward voice pickup unit 15 picks up a voice from the forward direction corresponding to an image acquired by the image sensing unit 12.

The backward voice pickup unit 16 is a voice acquisition unit having a microphone or the like. The backward voice pickup unit 16 picks up the photographer's voice.

It is also possible to form the forward voice pickup unit 15 and backward voice pickup unit 16 from a single microphone and determine a person who spoke, based on a picked-up voice.

The voice processing unit 18 processes voices picked up by the forward voice pickup unit 15 and backward voice pickup unit 16, and converts them into texts. More specifically, the voice processing unit 18 includes a pattern determination unit (keyword determination unit) 18a which compares a voice pattern recorded in the voice pattern recording unit 20a with the pattern of a voice picked up by the forward voice pickup unit 15 or backward voice pickup unit 16, and determines the degree of matching. The voice processing unit 18 converts the voice into a text based on the result of determination by the pattern determination unit 18a, and classifies the voice based on the text. Note that a text converted from a voice by the voice processing unit 18 may be displayed together with a shot image later.

The voice determination by the pattern determination unit 18a is executed by, e.g., the following method. First, an input voice is analyzed as a time series of feature vectors at predetermined time intervals. Then, pattern matching is executed between the series of feature vectors and each word model (word model serving as a recognition candidate) output from the voice pattern recording unit 20a, thereby analyzing the input voice. An example of the pattern matching method is "speech recognition using probabilistic models".

Another voice determination method is keyword spotting other than pattern matching. According to this technique, all voice signals are searched for a part which is well relevant to a recognition candidate word registered in advance. When the relevance exceeds a threshold, the word is recognized. An example of this method is a "connected spoken word recognition algorithm by augmented continuous DP matching".

The recording unit 20 is a recording means for recording a shot image and the like. The recording unit 20 includes an image recording unit 20i which records a shot image, a voice pattern recording unit 20a which records voice pattern information, and a behavior database (DB) 20b which records object's behavior patterns and the like.

The behavior database 20b may record a text converted from a voice and an object's behavior pattern in association with each other. The behavior database 20b may also record the classification result of an unconverted voice and an object's behavior pattern in association with each other without converting the voice into a text. In this case, the voice processing unit 18 compares a voice pattern recorded in the voice pattern recording unit 20a with the pattern of a voice picked up by the forward voice pickup unit 15 or backward voice pickup unit 16, and determines the degree of matching. Then, the pattern determination unit 18a determines an object's behavior pattern corresponding to the voice pattern without using a text or keyword.

The manipulation determination unit 22 determines whether the user has manipulated the release switch or the like when performing a shooting manipulation. When the manipulation determination unit 22 detects the manipulation of the camera 10, various operations are executed under the control of the signal processing & control unit 11.

The display unit 23 includes a display panel formed from a liquid crystal or the like. The display unit 23 displays, e.g., a shot image on the display panel. The display unit 23 can display an image obtained by the image sensing unit 12 even before the shooting operation. While checking the display, the user can determine the composition, shooting timing, and the like.

The timepiece unit 24 associates a shot image with shooting time.

The communication unit 25 communicates with an external device or the like wirelessly or via a wire. The communication unit 25 can associate, for example, a shooting position with a shot image, and exchange images and accessory information with the external device. Examples of the wireless means are infrared communication and a wireless LAN, and an example of the wired means is a USB.

Figure 2:
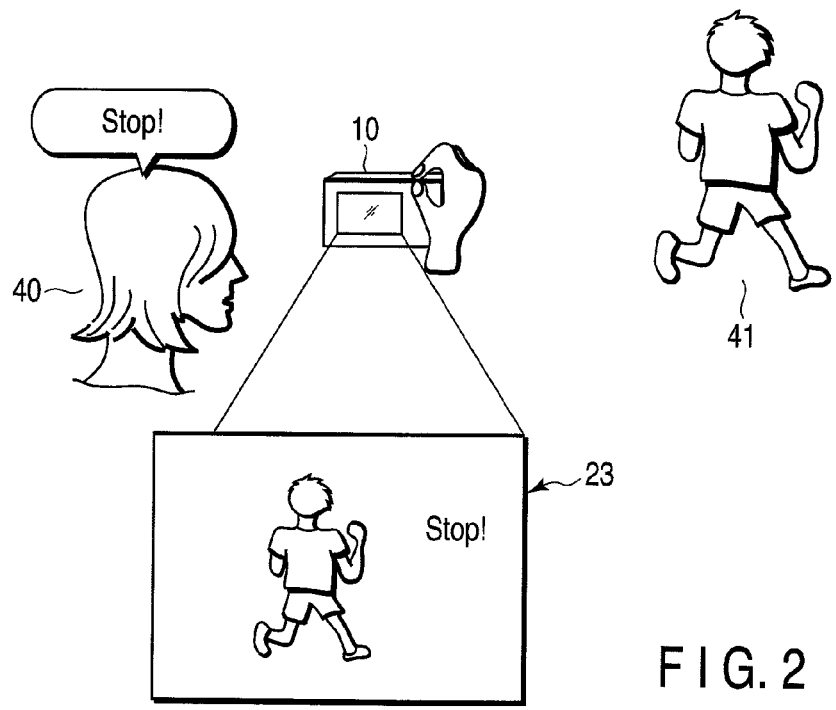
FIG. 2 is a view showing an example of the use of the camera and visualization of its effect according to the first embodiment of the image sensing device of the present invention.

FIG. 2 is a view showing an example of the use of the camera 10 and visualization of its effect.

In the example shown in FIG. 2, a photographer 40 (mother) takes a picture of a moving object 41 (child). It is often the case that the photographer 40 (mother) takes a picture while calling to the object 41 (child), like "Stop!"

In this situation, the photographer 40 (mother) does not say much, and generally only calls out, "Stop!", "Look at me!", or the like, or only calls the object 41 (child) by name. Thus, the camera 10 suffices to detect only a keyword contained in such an utterance or a voice component (voice pattern) corresponding to the keyword. As will be described in detail, a keyword contained in a voice uttered by the photographer is converted into a text. The text is composited with an image and displayed/recorded, thereby presenting a detailed shooting situation on the shot image.

When the object 41 is a child, he does not always act as expected by the photographer in response to an utterance spoken by the photographer 40. In the example shown in FIG. 2, an action the object 41 is expected to take in response to an utterance "Stop!" spoken by the photographer 40 is to "stop". However, the child object 41 may keep moving against the instruction from the photographer 40. Thus, an action the object 41 took in response to an utterance spoken by the photographer 40 needs to be determined.

In the first embodiment, the camera 10 detects the state of the object 41 when the photographer 40 calls to him and a subsequent state of the object 41. The camera 10 determines whether a change between the two states coincides with a predetermined state change. Only if so, the camera 10 permits a release manipulation. The photographer 40 can therefore photograph the object 41 in a state the photographer 40 wants.

More specifically, if the state of the object 41 has changed from a "moving state" to a "stopped state", the camera 10 determines that the object 41 has taken an expected action "stop" in response to the utterance "Stop!" spoken by the photographer 40.

The operation of the camera 10 according to the first embodiment will be described in detail with reference to the flowchart shown in FIG. 3.

FIG. 3 is a flowchart for explaining an example of the control operation of the camera 10 according to the first embodiment of the present invention. The signal processing & control unit 11 mainly executes the following operation of the camera 10.

After the sequence of this flowchart starts, it is determined in step S1 whether the shooting mode has been set (step S1). If the shooting mode has been set, the process shifts to step S2; if no shooting mode has been set (playback mode has been set), to step S16.

In step S2, images are loaded as so-called live view images from the image sensing unit 12. The images loaded in step S2 undergo image processing and the like to obtain a correct contrast and exposure in step S3. For example, the following image determination processing is also done. More specifically, a portion exhibiting a change (motion), a portion where the color remains changed, or the like among images loaded from the image sensing unit 12 is regarded to represent an object. The motion of the object is determined using a motion vector or the like.

In step S4, the display unit 23 displays the images loaded from the image sensing unit 12 after processing suited to display. In step S5, the forward voice pickup unit 15 and backward voice pickup unit 16 pick up a voice before the camera 10 (voice uttered by the object 41) and a voice behind it (voice uttered by the photographer 40). The voice processing unit 18 executes predetermined processing for these voices, and the recording unit 20 records the processed voices. In the voice pickup of step S5, at least a backward voice (voice uttered by the photographer 40) is picked up (a forward voice (voice uttered by the object 41) need not always be picked up).

Figures 4, 5:
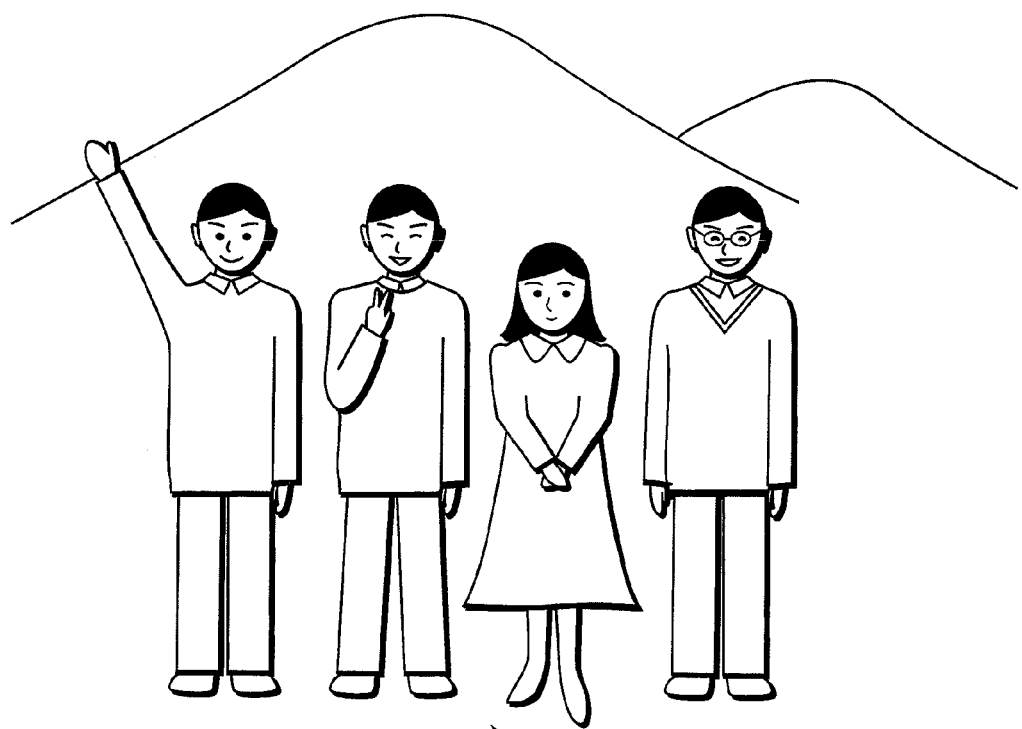
FIG. 4 is a correspondence table between a keyword and the action state of the object.
FIG. 5 is a view showing an example in which the photographer does not hold a camera.

Subsequently, in step S6, it is determined whether the backward voice picked up in step S5 contains a keyword described in a correspondence table shown in FIG. 4 or voice component (voice pattern) information (details of which will be described later) corresponding to the keyword. FIG. 4 shows the correspondence table between a keyword and corresponding voice component (voice pattern) information, and the action state of the object. The correspondence table is formed from data recorded in the voice pattern recording unit 20a which records voice pattern information and the behavior database (DB) 20b which records object's behavior patterns and the like.

In the determination of step S6, the pattern determination unit 18a compares the loaded voice pattern with a voice pattern recorded in the voice pattern recording unit 20a. If it is determined that the loaded backward voice contains the keyword which is a call, or voice component (voice pattern) information corresponding to the keyword, the process shifts to step S7; if NO, to step S11.

In step S7, the keyword is converted into a text. More specifically, the keyword is a call to be described below. In step S7, a keyword corresponding to a call is selected and converted into a text. In step S8, the display unit 23 displays the text. The processing in step S7 need not be executed when the object state is determined by looking up the correspondence table shown in FIG. 4 based on the voice component (voice pattern) information without the mediacy of the keyword (without using the keyword). The processing in step S8 may not also be performed.

When the object is a child and may not act as the photographer intends, as described above, the photographer often takes a picture while calling to the object. In this situation, the camera starts shooting only when it determines that the object has acted as the photographer intended.

Utterances spoken to the object in this situation are selected from a limited vocabulary. Hence, the camera requires neither a large-volume database, like a general dictionary, nor an advanced voice recognition function.

As the keywords (typical utterances spoken by the photographer to the object), only utterances used for a general call are useful, including "Stop!", "Come here!", "Look at me!", "Smile!", "Say cheese!", "Give me a pose!", and "Move closer!" These keywords and pieces of voice component (voice pattern) information corresponding to them are recorded in advance in the voice pattern recording unit 20a of the recording unit 20.

As is apparent from the correspondence table shown in FIG. 4, the keyword and voice component (voice pattern) information corresponding to it, and the action and face state of an object have a correspondence.

For example, as for a keyword or voice component (voice pattern) information "Stop!" corresponding to the keyword, if the action of the object changes from "action" to "none" and his face state does not change, he takes an action complying with the keyword or voice component (voice pattern) information corresponding to it. As for a keyword or voice component (voice pattern) information "Look at me!" corresponding to the keyword, if the action of the object changes from "action" to "none" and his face state changes from "none (no face is captured)" to "changed (face is captured)", he takes an action complying with the keyword.

The change patterns of various actions are recorded in the behavior database 20b of the recording unit 20.

The keywords and pieces of voice component (voice pattern) information corresponding to them are not limited to the above-mentioned ones. Utterances such as "◯◯, stop!" and "Smile, all!" may be set in addition to the foregoing keywords and pieces of voice component (voice pattern) information corresponding to the keywords.

In step S9, by looking up the correspondence table shown in FIG. 4, the face detection unit 14 and motion determination unit 13 detect and determine an object change (image change) in response to each keyword or voice component (voice pattern) information corresponding to it. That is, in step S9, changes of the action and face state of the object in response to each keyword or voice component (voice pattern) information corresponding to it are determined.

If it is determined in step S10 that changes of the action and face state of the object match each keyword or voice component (voice pattern) information corresponding to it (match the correspondence table shown in FIG. 4), it is determined that shooting is possible, and the process shifts to step S12. If it is determined that the action or face state of the object does not match each keyword or voice component (voice pattern) information corresponding to it (does not match the correspondence table shown in FIG. 4), it is determined that the current situation is not suitable for shooting, and the process shifts to step S11.

In step S11, the manipulation determination unit 22 and signal processing & control unit 11 determine whether the photographer has performed a shooting manipulation. In this case, if it is determined that the photographer has manipulated the release button in the manipulation determination unit 22, the process shifts to step S12 to execute shooting processing. In the shooting processing executed upon a shift from step S11 to step S12, shooting is done though neither the action nor face state of the object matches the keyword or voice component (voice pattern) information corresponding to it (does not match the correspondence table shown in FIG. 4). For example, the object does not react to a call from the photographer, so no best shot would be taken, but even so the photographer takes a picture.

If it is determined in step S10 that the action and face state of the object match the keyword or voice component (voice pattern) information corresponding to it (match the correspondence table shown in FIG. 4), the process shifts from step S10 to step S12 to execute shooting processing without determining whether the photographer has performed a shooting manipulation.

After the processing in step S12, the process shifts to step S13. In step S13, the forward voice pickup unit 15 determines whether there is a voice in front of the camera 10 when picking up a voice in step S5.

If there is a forward voice, the process shifts to step S14 to convert the voice into a text, and then to step S15. If there is no forward voice, the process shifts from step S13 to step S15.

In step S15, both the shot image and the text (corresponding to a backward voice) acquired by the above-described processing are recorded in the recording unit 20. Then, the sequence ends. It is also possible to convert even a forward voice into a text in step S13 and display the text together with a display image when playing back the image.

Note that a step of presenting a display to confirm whether to perform recording processing may be inserted before the recording processing in step S15. Even when no image is loaded, a text may be displayed in step S8. Further, the process may return to step S1 after the processing in step S15.

If it is determined in step S1 that no shooting mode has been set, the process shifts to step S16 to determine whether the playback mode has been set. If it is determined that the playback mode has been set, the process shifts to step S17 to play back an image.

In the playback processing of step S17, the thumbnails of images, a slide show of images, and date information are displayed. In step S17, a desired image can also be searched for and displayed using a text generated by the foregoing processing. For example, the text composition unit 11a composites an image and text to be displayed on the display unit 23.

In step S18, it is determined whether a manipulation has been done to transmit the playback processing result to an external device. If it is determined that a manipulation has been done to transmit the playback processing result to an external device, the process shifts to step S19 to transmit the playback processing result to the external device. After that, the sequence ends. If it is determined that no manipulation has been done to transmit the playback processing result to an external device, the process shifts to step S16.

As described above, the first embodiment can provide an image sensing device and camera capable of determining whether an object reacts literally to an utterance spoken by the photographer, and taking a picture of the object at an appropriate timing.

In the display of a keyword (utterance spoken by the photographer; backward voice) in the text format, the font, color, size, and the like of the text may be properly set, and an icon or the like may also be displayed additionally.

Further, when converting a forward voice, which is object's voice, into a text, the font, color, size, and the like of the text may be determined in accordance with the expression of the object, and an icon or the like may also be displayed additionally.

The first embodiment has exemplified a case in which the object is a child, but the present invention is not limited to this. For example, the present invention can be modified as follows.

Modification

In the camera 10 according to the first embodiment, the backward voice pickup unit 16 picks up photographer's voice. However, a series of processes described above is possible even when the photographer is not behind the camera 10, i.e., he does not hold the camera.

A case will be exemplified, in which there are a plurality of objects 41 and the camera 10 held by a tripod takes a picture of them using a self-timer, as shown in FIG. 5.

In this case, the camera 10 is configured to perform shooting processing when, for example, the photographer says, "Give me a pose!", the self-timer operates, and the photographer among the objects 41 makes a predetermined motion.

Determination of a state change of the object 41 and a series of other processes are the same as those in the first embodiment, and a description thereof will not be repeated.

This arrangement allows easily taking a photo at a timing the photographer wants even in shooting using the self-timer.

This shooting can also be achieved without using the self-timer. In this case, not the backward voice pickup unit 16 but the forward voice pickup unit 15 picks up a voice (e.g., "Give me a pose!"). The above-described processing is done based on a keyword contained in the voice uttered by the photographer.

In this case, the camera can take a picture at a timing the photographer wants, without using the self-timer.

Note that the modification has exemplified the use of the tripod. However, the present invention is not limited to this and is applicable to a case in which shooting is performed in a hands-free state.

Second Embodiment

An image sensing device and camera according to the second embodiment of the present invention will be described. To avoid a repetitive description, a difference from the image sensing device and camera according to the first embodiment will be explained. The basic arrangement and operation of the camera are the same as those in the first embodiment shown in FIGS. 1 to 5. The same reference numerals as those in the first embodiment will denote the same parts, and an illustration and description thereof will not be repeated.

In the first embodiment, the photographer gives an utterance serving as a keyword to an object, and if the object makes a motion corresponding to the keyword, takes a picture. In contrast, in the second embodiment, the camera gives an utterance serving as a keyword, and if the object makes a motion corresponding to the keyword, performs shooting processing.

Figure 6:
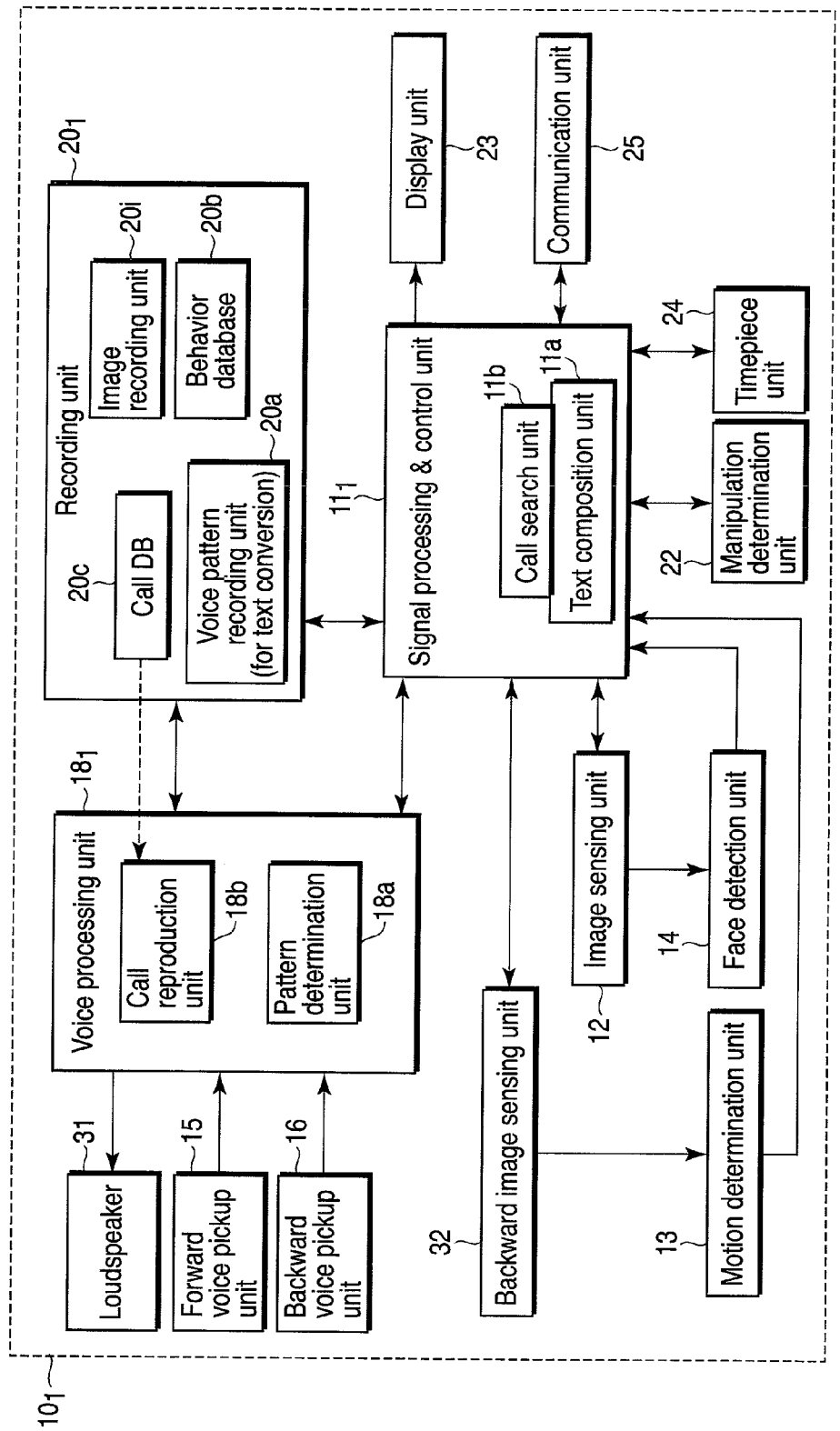
FIG. 6 is a block diagram showing an example of the schematic arrangement of a camera according to the second embodiment of the present invention.

FIG. 6 is a block diagram showing an example of the schematic arrangement of a camera according to the second embodiment of the present invention.

As shown in FIG. 6, a camera $10_1$ according to the second embodiment of the present invention comprises a signal processing & control unit $11_1$, image sensing unit 12, motion determination unit 13, face detection unit 14, forward voice pickup unit 15, backward voice pickup unit 16, voice processing unit $18_1$, recording unit $20_1$, manipulation determination unit 22, display unit 23, timepiece unit 24, communication unit 25, loudspeaker 31, and backward image sensing unit 32.

The signal processing & control unit $11_1$ includes a text composition unit 11a, and a call search unit 11b for searching for a call (voice for a call) read out from a call database 20c.

The voice processing unit $18_1$ includes a pattern determination unit 18a, and a call reproduction unit 18b for reproducing a call read out from the call database 20c.

The recording unit $20_1$ includes an image recording unit 20i, a voice pattern recording unit 20a, a behavior database (DB) 20b, and the call database (DB) 20c which is a database of calls recorded in advance in the camera $10_1$. An example of the calls recorded in the call database 20c is photographer's voice, a voice other than the photographers', or an electronically generated voice.

The loudspeaker 31 outputs a call reproduced by the call reproduction unit 18b from the camera $10_1$. The call reproduced by the call reproduction unit 18b is one detected by the call search unit 11b among calls recorded in the call database 20c.

The backward image sensing unit 32 is arranged on the back side of the camera $10_1$ in order to capture photographer's expression. Based on the photographer's expression captured by the backward image sensing unit 32, it is determined whether an image is one the photographer wants.

The operation of the camera $10_1$ according to the second embodiment will be explained with reference to the flowchart shown in FIG. 7. The signal processing & control unit $11_1$ mainly executes the following operation of the camera $10_1$.

Figure 7:
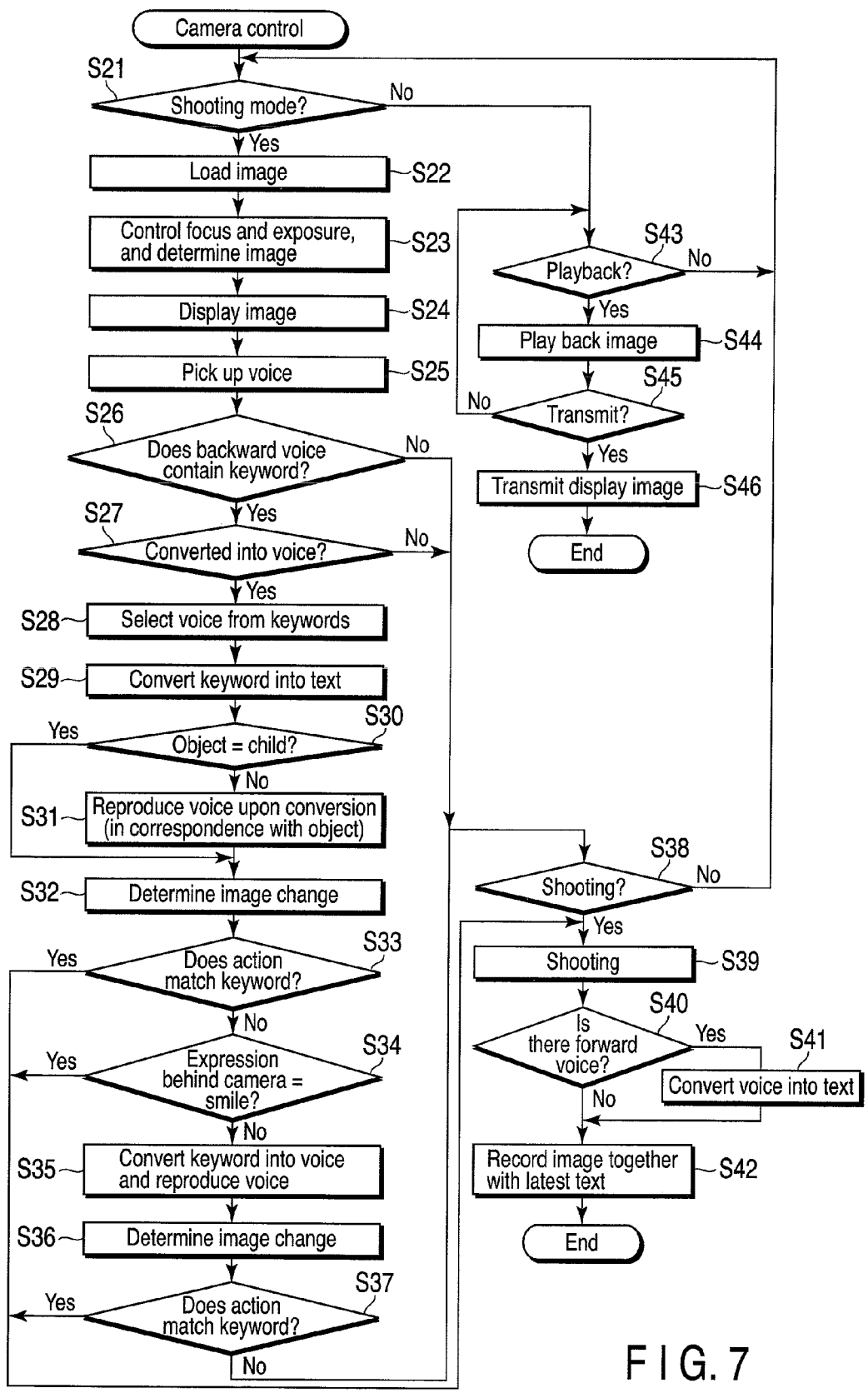
FIG. 7 is a flowchart showing an example of the control operation of a camera 10 according to the second embodiment of the present invention.

FIG. 7 is a flowchart for explaining the control operation of the camera $10_1$ according to the second embodiment of the present invention. Processing operations in steps S21 to S25 and S38 to S46 shown in the flowchart of FIG. 7 are the same as those in step S1 to S5 and S11 to S19 in the flowchart of FIG. 3 described above. By referring to corresponding step numbers, a detailed description of the same operations will not be repeated.

After the sequence starts, it is determined in step S21 whether the shooting mode has been set. If the shooting mode has been set, the process shifts to step S22. If no shooting mode has been set, the process shifts to step S43 to execute playback processing in steps S43 to S46.

If the shooting mode has been set, so-called live view images are loaded, and voices before and after the camera $10_1$ are picked up in steps S22 to S25.

In step S26, it is determined whether the backward voice picked up in step S25 contains a keyword recorded in the call database 20c (described in a correspondence table shown in FIG. 8 to be described later).

More specifically, the call search unit 11b compares the pattern of the voice picked up in step S25 with a voice pattern recorded in the call database 20c. Based on the comparison result, the pattern determination unit 18a makes the determination in step S26. If it is determined in step S26 that the backward voice contains a keyword, the process shifts to step S27; if NO, to step S38.

In step S27, it is determined whether the photographer has performed a manipulation to convert the call into a voice and output the voice. For example, when the photographer is an introverted person, he suffices to convert a call into a voice and output the voice.

More specifically, a switch for a voice conversion mode may be arranged in the manipulation determination unit 22 of the camera $10_1$. Whether to perform voice conversion is determined based on the ON/OFF state of the switch. When performing voice conversion, the process shifts to step S28; if NO, to step S38.

Note that the determination in step S27 is not limited to the above-mentioned example based on the ON/OFF state of the switch. For example, photographer's face may be recorded in the recording unit $20_1$ together with information indicating whether voice conversion is necessary or unnecessary. In this case, the determination in step S27 is made based on photographer's face captured by the backward image sensing unit 32. It is also possible to determine the volume of a call and make the determination in step S27 based on the determination result. In this case, the determination in step S27 can also be done when picking up a voice in step S25.

In step S28, a voice to be reproduced is selected from keywords.

As described above, when an object does not easily follow the photographer's instruction, the photographer often takes a picture while calling to the object. In this case, for example, if the photographer is an introverted person, he converts a keyword into a voice and outputs the voice from the loudspeaker 31.

Call voices (keywords) to the object in this situation are selected from a limited vocabulary. Thus, the camera requires neither a large-volume database, like a general dictionary, nor an advanced voice recognition function.

As typical voices (calls or keywords) uttered by the photographer to the object, "Stop!", "Come here!", "Look at me!", "Smile!", "Say cheese!", "Give me a pose!", "Move closer!", and the like are sufficient, similar to the first embodiment. These reproduction voices are recorded in the call database 20c of the recording unit 20.

An utterance serving as the foregoing keyword is converted into a voice in accordance with, e.g., a correspondence table (see FIG. 8) between a keyword contained in a voice and a reproduction voice. For example, for a keyword "Stop!", a voice (amplified reproduction voice) reproduced after voice conversion is "Please stop." For a keyword "Give me a pose!", a voice (amplified reproduction voice) reproduced after voice conversion is "Please give me a pose."

Note that the correspondence table shown in FIG. 8 is merely an example, and the present invention is not limited to this.

After the processing in step S28, a reproduction voice corresponding to each keyword is selected and converted into a text in step S29.

In step S30, it is determined whether the object is a child. This determination is made based on at least one of the result of detection by the face detection unit 14, the ratio of the face and body of the object, the size of the object, and the like. Alternatively, the face of a child may be registered in advance in the image recording unit 20i of the recording unit $20_1$. The determination in step S30 is done based on the registered image (e.g., compared with the result of detection by the face detection unit 14).

If it is determined in step S30 that the object is a child, the process shifts to step S31; if NO, to step S32.

In step S31, the call reproduction unit 18b reproduces the voice which corresponds to the keyword selected in step S28 and has been generated by voice conversion.

In other words, when the object is not a child and the photographer is an introverted person, steps S30 and S31 are executed to call to the object by a voice recorded in the camera $10_1$ instead of the photographer.

In step S32, a change of the image in response to the keyword is determined by looking up the correspondence table shown in FIG. 8. That is, an action change (state change) of the object in response to the keyword is determined.

If it is determined that the action (state) of the object matches (corresponds to) the keyword, it is determined in step S33 that shooting is possible, and the process shifts to step S39. If it is determined that the action (state) of the object does not match (correspond to) the keyword, the process shifts to step S34.

The determination in step S33 is made based on the correspondence table shown in FIG. 4 in the first embodiment described above. However, the determination may be made based on another criterion. The correspondence table shown in FIG. 4 is merely an example, and the present invention is not limited to this.

In step S34, photographer's expression captured by the backward image sensing unit (backward camera) 32 is determined. This determination is performed based on a face detected by the face detection unit 14. If the photographer smiles, it is determined that shooting is possible even when the action (state) of the object does not match (correspond to) the keyword. In this case, the process shifts to step S39. If it is determined in step S34 that the photographer does not smile, the process shifts to step S35.

In step S35, the call reproduction unit 18b reproduces again the voice generated by voice conversion of the keyword selected in step S28. However, the voice reproduced in step S35 is different in tone from that reproduced in step S31. For example, the voice reproduced in step S35 is higher in frequency than that reproduced in step S31, or is the voice of a third person other than the photographer.

In step S35, the object is called in a voice different in tone from the reproduction voice in step S31 so as to attract object's attention in accordance with photographer's expression (whether he smiles) in consideration of a case in which the object does not respond to the voice reproduced in step S31 and does not act as the photographer intends. For example, even when the object is a child, his attention can be attracted by calling to him in an amplified reproduction voice for the second time.

In step S36, a change of the image in response to the keyword is determined by looking up the correspondence table shown in FIG. 8. That is, an action (state) change of the object in response to the keyword is determined.

In step S37, it is determined based on the determination result in step S36 whether the action (state) of the object matches (corresponds to) the keyword. If it is determined in step S37 that shooting is possible, the process shifts to step S39. If it is determined that the action (state) of the object does not match (correspond to) the keyword, the current situation is not suitable for shooting, so the process shifts to step S38.

In step S38, the manipulation determination unit 22 determines whether the photographer has performed a shooting manipulation. In this case, if the photographer has manipulated the release button in the manipulation determination unit 22, the process shifts to step S39 to execute shooting processing. In this case, shooting is done though it is determined in step S33 or S37 that the action (state) of the object does not match (correspond to) the keyword.

If it is determined in step S33 or S37 that the action (state) of the object matches (corresponds to) the keyword, the process shifts to step S39 to execute shooting processing.

Operations in steps S39 to S42, and those in steps S43 to S46 in the playback mode are the same as those in the first embodiment.

Note that a step of presenting a display to confirm whether to perform recording processing may be inserted before the recording processing in step S42.

As described above, the second embodiment can provide an image sensing device and camera capable of determining whether an object reacts literally to an utterance spoken by the photographer, and taking a picture at an appropriate timing.

Since a call (voice) to the object is converted into a text, the text can be used for various purposes later by recording it together with a shot image.

When displaying a call serving as a keyword in the text format, the font, color, size, and the like of the text may be changed, and an icon or the like may also be added. When converting, into a text, a voice in front of the camera $10_1$, which is a voice uttered by an object, the font, color, size, and the like of the text may be determined in accordance with the expression of the object, and an icon or the like may also be added.

The above-described embodiments and modification have exemplified a camera as an image sensing device. However, the present invention is not limited to this and is applicable to, e.g., a cell phone in addition to the camera.

The above-described embodiments and modification is applicable not only to an image sensing device for acquiring a still image, but also to an image sensing device for acquiring a moving image, which will be described in detail below.

[Example of Application to Image Sensing Device for Acquiring Moving Image]

Figure 9:
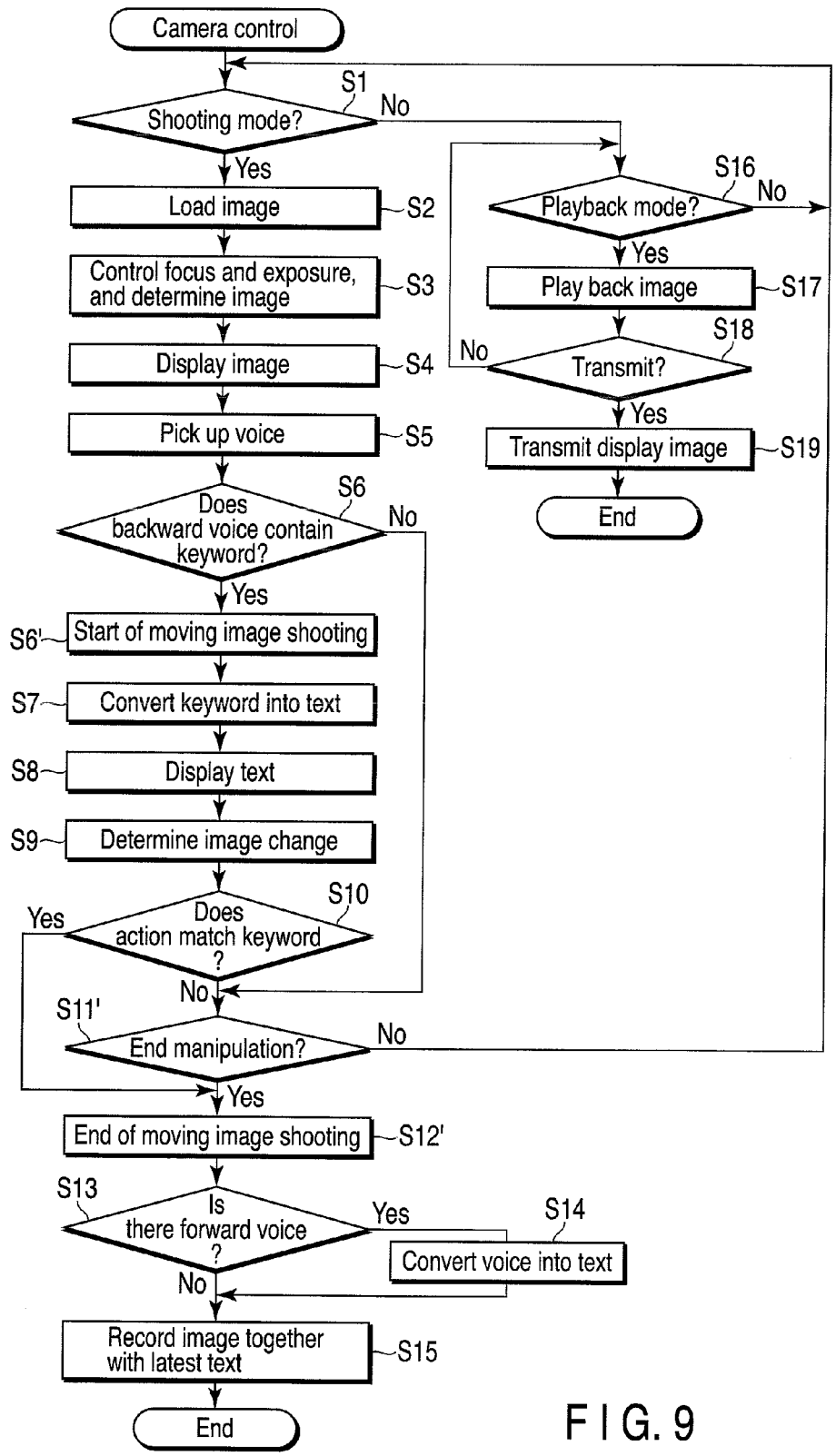
FIG. 9 is a flowchart showing the control operation of the camera when acquiring a moving image using the image sensing device according to the first embodiment.

FIG. 9 is a flowchart showing the control operation of the camera 10 when acquiring a moving image using the image sensing device according to the first embodiment.

To avoid a repetitive description, only a difference from the flowchart shown in FIG. 3 will be explained. The difference from the flowchart shown in FIG. 3 is that step S6' is inserted between steps S6 and S7, the processing contents of step S11 are changed (to step S11'), and those of step S12 are changed (to step S12').

In step S6', moving image shooting starts.

In step S11', it is determined whether the photographer has performed a manipulation to end the moving image shooting which has started in step S6'. If NO in step S11', the process returns to step S1. If YES in step S11', the process shifts to step S12'.

In step S12', the moving image shooting ends.

As described above, by modifying the first embodiment, the present invention can provide an image sensing device and camera capable of easily acquiring a moving image representing, for example, how a child reacts to a call from his parent.

That is, the present invention can provide an image sensing device and camera capable of recording a series of communications between a child and his parent as a moving image having a definite start and end without performing a delicate manipulation by the user.

Additional advantages and modifications will readily occur to those skilled in the art. Therefore, the invention in its broader aspects is not limited to the specific details and representative embodiments shown and described herein.

Accordingly, various modifications may be made without departing from the spirit or scope of the general inventive concept as defined by the appended claims and their equivalents.

What is claimed is:

1. An image sensing device comprising:
an image sensing unit configured to shoot an object and acquire an image;
a recording unit configured to record correspondence data formed by making an action state of the object and voice information recorded prior to the shooting to correspond to each other;
a voice acquisition unit configured to acquire at least a voice uttered by an operator of the image sensing device;
a voice determination unit configured to determine whether the voice acquired by the voice acquisition unit contains the voice information which forms the correspondence data;
an action state determination unit configured to, when the voice determination unit determines that the voice acquired by the voice acquisition unit contains the voice information which forms the correspondence data, determine whether the action state of the object that corresponds to the voice information and an actual action state of the object match each other;
a control unit configured to, when the action state determination unit determines that the action state of the object that corresponds to the voice information and the actual action state of the object match each other, control shooting processing by the image sensing unit; and
a voice processing unit configured to, when the voice acquired by the voice acquisition unit contains the keyword which forms the correspondence data, reproduce and output one of a first voice obtained by converting the keyword into a voice and a second voice obtained by changing the first voice,
wherein the recording unit also records correspondence data formed by making the action state of the object and a keyword recorded prior to the shooting to correspond to each other.

2. The device according to claim 1, wherein when the action state determination unit determines that the action state of the object that corresponds to the keyword and the actual action state of the object do not match each other, the voice processing unit reproduces and outputs the second voice.

3. An image sensing device comprising:
an image sensing unit configured to shoot an object and acquire an image;
a recording unit configured to record correspondence data formed by making an action state of the object and voice information recorded prior to the shooting to correspond to each other;
a voice acquisition unit configured to acquire at least a voice uttered by an operator of the image sensing device;
a voice, determination unit configured to determine whether the voice acquired by the voice acquisition unit contains the voice information which forms the correspondence data;
an action state determination unit configured to, when the voice determination unit determines that the voice acquired by the voice acquisition unit contains the voice information which forms the correspondence data, determine whether the action state of the object that corresponds to the voice information and an actual action state of the object match each other; and
a control unit configured to, when the action state determination unit determines that the action state of the object that corresponds to the voice information and the actual action state of the object match each other, control shooting processing by the image sensing unit,
wherein the recording unit also records correspondence data formed by making the action state of the object and a keyword recorded prior to the shooting to correspond to each other, and
wherein the control unit comprises
a text conversion unit configured to convert the keyword into a text, and
a reproduction output unit configured to reproduce and output the keyword converted into the text together with the image when playing back and outputting the image acquired by the image sensing unit.

4. An image sensing device comprising:
a first image sensing unit configured to shoot an object and acquire an image;
a recording unit configured to record correspondence data formed by making an action state of the object and a predetermined keyword to correspond to each other;
a voice acquisition unit configured to acquire at least a voice uttered by an operator of the image sensing device;
a keyword determination unit configured to determine whether the voice acquired by the voice acquisition unit contains the keyword which forms the correspondence data;
a second image sensing unit configured to shoot the operator of the image sensing device and acquire an image;
an action state determination unit configured to, when the keyword determination unit determines that the voice acquired by the voice acquisition unit contains the keyword which forms the correspondence data, determine, based on the image acquired by the first image sensing unit and the image acquired by the second image sensing unit, whether the action state of the object that corresponds to the keyword and an actual action state of the object match each other; and
a shooting control unit configured to, when the action state determination unit determines that the action state of the object that corresponds to the keyword and the actual action state of the object match each other, control shooting processing by the first image sensing unit.

5. The device according to claim 4, wherein
the shooting control unit comprises a backward image sensing unit configured to shoot photographer's expression, and
the shooting control unit controls shooting processing by the first image sensing unit, based on the photographer's expression shot by the backward image sensing unit.

6. The device according to claim 4, further comprising a voice processing unit configured to, when the voice acquired by the voice acquisition unit contains the keyword which forms the correspondence data, reproduce and output a voice obtained by converting a keyword associated with the keyword into a voice.

7. The device according to claim 4, wherein the shooting control unit comprises
a text conversion unit configured to convert the keyword into a text, and
a reproduction output unit configured to reproduce and output the keyword converted into the text together with the image when playing back and outputting the image acquired by the first image sensing unit.

8. The device according to claim 4, wherein the recording unit records the image of the object shot under control of the shooting control unit, and the keyword.

9. The device according to claim 4, wherein the action state determination unit makes the determination based on an action state including a face state of the object.

10. The device according to claim 4, wherein the voice acquisition unit acquires a voice uttered behind the image sensing device.

11. The device according to claim 4, wherein the voice acquisition unit acquires at least a voice uttered behind the image sensing device.

12. The device according to claim 4, wherein the shooting control unit controls to designate a start and/or end of shooting processing.

13. The device according to claim 4, wherein the shooting control unit controls the first image sensing unit to execute action shooting processing only during a period until an action of the object is completed after determination by the keyword determination unit.

* * * * *